United States Patent [19]

Hiratsuka et al.

[11] Patent Number: 5,754,393
[45] Date of Patent: May 19, 1998

[54] ELECTRIC DOUBLE LAYER CAPACITOR

[75] Inventors: Kazuya Hiratsuka; Takeshi Kawasato; Manabu Suhara; Katsuji Ikeda; Karl Ludger Neumann; Takeshi Morimoto, all of Yokohama, Japan

[73] Assignee: Asahi Glass Company Ltd., Tokyo, Japan

[21] Appl. No.: 604,794

[22] Filed: Feb. 23, 1996

[30] Foreign Application Priority Data

Mar. 7, 1995 [JP] Japan .................................. 7-047316

[51] Int. Cl.$^6$ ...................................................... H01G 9/02
[52] U.S. Cl. ............................. 361/505; 361/502; 361/504
[58] Field of Search ............................... 361/327, 502, 361/503, 504, 505, 301.1, 501; 252/62.2, 500

[56] References Cited

U.S. PATENT DOCUMENTS

| | | |
|---|---|---|
| 4,725,926 | 2/1988 | Morimoto et al. . |
| 4,725,927 | 2/1988 | Morimoto et al. . |
| 4,762,644 | 8/1988 | Kobayashi et al. ............ 252/500 |
| 5,068,060 | 11/1991 | Jen et al. ........................ 252/500 |
| 5,462,820 | 10/1995 | Tanaka ........................... 429/174 |

FOREIGN PATENT DOCUMENTS

| | | |
|---|---|---|
| 49-68254 | 7/1974 | Japan . |
| 63-12121 | 1/1988 | Japan . |
| 63-173312 | 7/1988 | Japan . |
| 63-213914 | 9/1988 | Japan . |
| 1-214106 | 8/1989 | Japan . |
| 1-258409 | 10/1989 | Japan . |

*Primary Examiner*—Leo P. Picard
*Assistant Examiner*—Phuong T. Vu
*Attorney, Agent, or Firm*—Oblon, Spivak, McClelland, Maier & Neustadt, P.C.

[57] ABSTRACT

An electric double layer capacitor which includes a polarization electrode and an electrolyte capable of forming an electric double layer on the surface of the polarization electrode, wherein the solvent in the electrolyte is an organic type mixed solvent containing sulfolane or a sulfolane derivative, and a chain carbonic acid ester represented by the general formula $R^1O(CO)OR^2$ (wherein $R^1$ and $R^2$, which may be the same or different, are monovalent organic groups).

8 Claims, No Drawings

1

ELECTRIC DOUBLE LAYER CAPACITOR

BACKGROUND OF THE INVENTION

1. Field of the Invention

The present invention relates to an electric double layer capacitor, particularly to an electric double layer capacitor having a high working voltage and a high energy density.

2. Discussion of Background

In order to make an electric double layer capacitor smaller and lighter without any change in its capacitance, it is necessary to increase the storage energy density of the electric double layer capacitor. The storage energy of a electric double layer capacitor is proportional to its electrostatic capacitance and the square of its working voltage. Accordingly, in order to increase the energy density of an electric double layer capacitor, it is effective to increase the working voltage by use of an electrolyte having a high decomposition voltage.

Conventional electric double layer capacitors use, as an electrolyte, not only aqueous electrolytes containing a mineral acid such as sulfuric acid, an alkali metal salt or an alkali, but also various non-aqueous electrolytes. Non-aqueous (organic type) electrolytes are advantageous because their decomposition voltage is from 2 V to 3 V, while the decomposition voltage of aqueous ones is about 1.2 V.

As solvents in non-aqueous electrolytes, propylene carbonate, which is disclosed in Japanese Unexamined Patent Publication No. 68254/1974, γ-butyrolactone, acetonitrile, dimethylformamide, and sulfolane and its derivatives, which are disclosed in U.S. Pat. No. 4,725,927, are known.

Among them, sulfolane is a solvent having excellent resistance to oxidation and high decomposition voltage. However, because of its high freezing point, its electrical conductivity decrease considerably at low temperatures. Therefore, there are problems that charging at a low temperature takes a long time, and that at the time of discharge of a large electrical current, the output voltage decreases remarkably due to the internal resistance.

To improve the disadvantageous low-temperature properties of sulfolane, U.S. Pat. No. 4,725,927 proposes to use a mixed solvent consisting of sulfolane and a sulfolane derivative having a low freezing point as a solvent in non-aqueous electrolytes. But the electrical conductivity of such an electrolyte is not low enough at a low temperature. On the other hand, Japanese Unexamined Patent Publication No. 51284/1991 proposes an electric double layer capacitor employing a mixed solvent consisting of sulfolane and a cyclic carbonic acid ester such as propylene carbonate as a solvent in the electrolyte, but its working voltage is below 3.0 V.

SUMMARY OF THE INVENTION

The object of the present invention is to solve the above-mentioned problems in the prior art and provide an electric double layer capacitor which is free from decrease in the output voltage at a low temperature and has a high energy density.

The present invention was accomplished to solve the above-mentioned problems, and provides an electric double layer capacitor comprising a polarization electrode and an electrolyte capable of forming an electric double layer on the surface of the polarization electrode, wherein the solvent in the electrolyte is an organic type mixed solvent containing sulfolane or a sulfolane derivative, and a chain carbonic acid ester represented by the general formula $R^1O(CO)OR^2$ (wherein $R^1$ and $R^2$, which may be the same or different, are monovalent organic groups).

DETAILED DESCRIPTION OF THE PREFERRED EMBODIMENTS

In the electric double layer capacitor of the present invention, as a constituent of the solvent in the electrolyte, chain carbonic acid esters are used, and they are electrochemically stable solvents having low freezing points and low viscosities at low temperatures. A mixed solvent containing a chain carbonic acid ester having such properties, and sulfolane or a sulfolane derivative which has a high decomposition voltage, can provide a stable electrolyte having a good electrical conductivity at a low temperature and a high decomposition voltage.

In the above general formula for the chain carbonic acid ester, $R^1$ and $R^2$ are selected appropriately from monovalent organic groups such as alkyl groups and aryl groups. A hydrogen or hydrogens of these monovalent organic groups may be substituted with halogens. Considering the melting point, the viscosity and dielectric constant of the resulting mixed solvent, it is preferred to select the organic groups $R^1$ and $R^2$ from the group consisting of $CH_3$, $C_2H_5$, $(CH_3)_2CH$, $CH_3(CH_2)_2$ and $CF_3CH_2$.

As preferable chain carbonic acid esters, dimethyl carbonate (DMC), diethyl carbonate (DEC), methyl ethyl carbonate (MEC), diisopropyl carbonate (DiPC), methyl isopropyl; carbonate (MiPC), ethyl isopropyl carbonate (EiPC), di-n-propyl carbonate (DnPC), di-2,2,2-trifluoroethyl carbonate (D222TFEC) and 2,2,2-trifluoroethyl methyl carbonate (222TFEMC) may be mentioned.

Sulfolane and its derivatives, especially sulfolane, are preferable as a constituent of the solvent in view of compatibility with a chain carbonic acid ester, resistance to oxidation and a high decomposition voltage. As sulfolane derivatives, substituted sulfolanes such as 3-methylsulfolane and 2,4-dimethylsulfolane may be mentioned. A mixing ratio of sulfolane or a sulfolane derivative to a chain carbonic acid ester in the mixed solvent is selected appropriately in view of the solubility of an electrolyte salt in the mixed solvent, the working temperature range and, in particularly the electrical conductivity required at a low temperature.

It is preferred that $R^1$ and $R^2$ in the chain carbonic acid ester are different monovalent organic groups since it is possible to increase the concentration of an electrolyte salt and thereby increase the electrical conductivity of the electrolyte as well, and to achieve a good electrical conductivity at a low temperature.

As the solvent in the electrolyte, a mixed solvent containing from 15 to 85 vol % of sulfolane or a sulfolane derivative and from 85 to 15 vol % of a chain carbonic acid ester is preferable in view of the internal resistance, the working voltage and the stability of the resulting electric double layer capacitor. A mixed solvent containing from 25 to 75 vol % of sulfolane or a sulfolane derivative and from 75 to 25 vol % of a chain carbonic acid ester is more preferable.

As the electrolyte salt used in the electrolyte, salts of alkali metal ions such as lithium ion and sodium ion, alkaline earth metal ions or quaternary onium cations such as $R^4N^+$ and $R^4P^+$ (wherein R is an alkyl group represented by $C_nH_{2n+1}$ (wherein $n \geq 1$) or an aryl group) with anions such as $BF_4^-$, $PF_6^-$, $Cl^-$, $CF_3SO_3^-$, $AsF_6^-$, $N(SO_2CF_3)_2^-$, $NO_3^-$, $ClO_4^-$, $Br^-$, and $SO_4^{2-}$ are preferable. Among these salts, salts of quaternary onium cations such as $R^4N^+$ (quaternary ammonium ion) or $R^4P^+$ (quaternary phosphonium ion) are preferably used. Particularly preferable electrolyte salts are tetrafluoroborate salts, hexafluorophosphate salts, hexafluoroarsenate salts, perchlorate salts and trifluoromethanesulfonate salts of quaternary onium cations. The concentration of the electrolyte salt in the electrolyte is preferred to be 0.3–2.0M, and particularly preferred to be 0.5–1.2M.

As the polarization electrodes used in the electric double layer capacitor of the present invention, any type of polarization electrodes may be used so long as they are composed mainly of electrochemically inert materials having large specific surface areas, and those composed mainly of activated carbon, carbon black, fine metal particles or eletro-conductive metal oxide fine particles, are preferable. Usually both a cathode and an anode of an electric double layer capacitor are polarization electrodes, but one of the electrodes may be a rechargeable non-polarization electrode, namely a non-polarization electrode containing an activated material for a secondary battery.

Now, the present invention will be described in further detail with reference to Examples (Examples 1 to 19) and Comparative Examples (Examples 20 to 24), but it should be understood that the present invention is by no means restricted to the specific examples.

To a mixture of 80 wt % of a coconut shell activated carbon powder obtained by a steam activation method, 10 wt % of polytetrafluoroethylene and 10 wt % of carbon black, ethanol was added, and the resulting mixture was kneaded and formed into a sheet. Then, the sheet was further rolled to a thickness of 0.6 mm and punched into disks of a diameter of 12 mm to obtain polarization electrodes.

The discoidal polarization electrodes were bonded inside a stainless steel case with a graphite type conductive adhesive on the cathode side and on the anode side which functions not only as a current collector but also as a housing of a coin-shaped capacitor cell, and subjected to vacuum heat treatment together with the stainless steel case to remove water and the like. The electrodes were impregnated with low-moisture, non-aqueous (organic type) electrolytes having compositions as shown in Tables 1 and 3, and a separator sheet made of a polyester nonwoven fabric was interposed between each of the two polarization electrodes. The stainless steel cases were crimp sealed by using insulating gaskets to obtain coin-shaped electric double layer capacitors having a diameter of 18.4 mm and a thickness of 2.0 mm.

With respect to each electric double layer capacitor, the initial electric discharge capacitance and the internal resistance were measured. Then, each capacitor was placed in a thermostat at 55° C., and after application of a voltage of 3.3 V for 500 hours, the electric discharge capacitance and the internal resistance were measured. From the changes in electric discharge capacitance and in internal resistance, the long term performance and the long term reliability of the respective capacitors under a high working voltage were estimated by extrapolation. The results are shown in Tables 2 and 4.

TABLE 1

| Example No. | Mixed solvent in electrolyte and mixing ratio (vol %) | Electrolyte salt and its molar concentration | |
|---|---|---|---|
| 1 | Sulfolane 70% + DMC 30% | $(C_2H_5)_4NBF_4$ | 0.6M |
| 2 | Sulfolane 70% + DMC 30% | $(C_2H_5)_4PBF_4$ | 0.6M |
| 3 | Sulfolane 70% + DMC 30% | $(C_2H_5)_3CH_3NBF_4$ | 1.0M |
| 4 | Sulfolane 70% + DMC 30% | $(C_4H_9)_4NBF_4$ | 0.6M |
| 5 | Sulfolane 70% + DMC 30% | $(C_2H_5)_3CH_3PBF_4$ | 1.0M |
| 6 | Sulfolane 50% + DMC 50% | $(C_2H_5)_4NBF_4$ | 0.6M |
| 7 | Sulfolane 70% + DEC 30% | $(C_2H_5)_4NBF_4$ | 0.6M |
| 8 | Sulfolane 70% + DEC 30% | $(C_2H_5)_3CH_3NBF_4$ | 1.0M |
| 9 | Sulfolane 80% + DEC 20% | $(C_2H_5)_3CH_3NBF_4$ | 1.0M |
| 10 | Sulfolane 70% + MEC 30% | $(C_2H_5)_4NBF_4$ | 0.6M |
| 11 | Sulfolane 70% + MEC 30% | $(C_2H_5)_4NBF_4$ | 1.0M |
| 12 | Sulfolane 70% + MEC 30% | $(C_2H_5)_3CH_3NBF_4$ | 1.0M |
| 13 | Sulfolane 70% + MEC 30% | $(C_2H_5)_3CH_3NBF_4$ | 1.5M |
| 14 | Sulfolane 70% + DiPC 30% | $(C_2H_5)_3CH_3NBF_4$ | 0.6M |
| 15 | Sulfolane 70% + MiPC 30% | $(C_2H_5)_4NBF_4$ | 0.6M |
| 16 | Sulfolane 70% + MiPC 30% | $(C_2H_5)_3CH_3NBF_4$ | 1.0M |
| 17 | Sulfolane 70% + DnPC 30% | $(C_2H_5)_3CH_3NBF_4$ | 0.6M |
| 18 | Sulfolane 70% + D222TFEC 30% | $(C_2H_5)_4NBF_4$ | 0.6M |
| 19 | Sulfolane 70% + 222TFEMC 30% | $(C_2H_5)_4NBF_4$ | 0.6M |

TABLE 2

| Example No. | Initial properties of capacitor | | | Properties of capacitor after the voltage-application test | |
|---|---|---|---|---|---|
| | Electric discharge capacitance (F) | Internal resistance (Ω) 20° C. | Internal resistance (Ω) 0° C. | Electric discharge capacitance (F) | Internal resistance (Ω) 20° C. |
| 1 | 2.02 | 9.4 | 13.4 | 1.80 | 22.1 |
| 2 | 1.99 | 9.6 | 13.8 | 1.80 | 22.9 |
| 3 | 2.13 | 8.7 | 12.9 | 1.88 | 21.5 |
| 4 | 1.82 | 11.8 | 16.1 | 1.61 | 20.3 |
| 5 | 2.08 | 7.8 | 12.1 | 1.86 | 22.2 |
| 6 | 1.98 | 9.8 | 13.7 | 1.75 | 25.1 |
| 7 | 1.96 | 9.8 | 13.6 | 1.73 | 23.4 |
| 8 | 2.00 | 9.0 | 13.0 | 1.82 | 21.0 |
| 9 | 1.95 | 9.9 | 14.8 | 1.84 | 23.9 |
| 10 | 2.01 | 9.5 | 13.7 | 1.82 | 21.8 |
| 11 | 2.05 | 8.0 | 12.0 | 1.83 | 20.8 |
| 12 | 2.06 | 7.8 | 11.5 | 1.83 | 19.9 |
| 13 | 2.08 | 6.1 | 10.9 | 1.85 | 18.2 |
| 14 | 1.89 | 11.7 | 16.8 | 1.63 | 25.7 |
| 15 | 1.94 | 10.1 | 15.6 | 1.67 | 24.6 |
| 16 | 1.99 | 8.8 | 13.3 | 1.78 | 22.0 |
| 17 | 1.85 | 12.7 | 17.3 | 1.61 | 27.8 |
| 18 | 2.11 | 8.9 | 14.1 | 1.88 | 24.2 |
| 19 | 2.12 | 8.8 | 14.0 | 1.89 | 23.7 |

TABLE 3

| Example No. | Mixed solvent in electrolyte and mixing ratio (vol %) | Electrolyte salt and its molar concentration | |
|---|---|---|---|
| 20 | Sulfolane 100% | $(C_2H_5)_4NBF_4$ | 0.6M |
| 21 | Sulfolane 70% + 3-methylsulfolane 30% | $(C_2H_5)_4NBF_4$ | 0.6M |
| 22 | Sulfolane 100% | $(C_2H_5)_3CH_3NBF_4$ | 0.6M |
| 23 | Sulfolane 100% | $(C_2H_5)_4PBF_4$ | 0.6M |
| 24 | Propylene carbonate 100% | $(C_2H_5)_4NBF_4$ | 0.6M |

TABLE 4

| | Initial properties of capacitor | | | Properties of capacitor after the voltage-application test | |
|---|---|---|---|---|---|
| Example No. | Electric discharge capacitance (F) | Internal resistance ($\Omega$) | | Electric discharge capacitance (F) | Internal resistance ($\Omega$) |
| | | 20° C. | 0° C. | | 20° C. |
| 20 | 1.86 | 14.5 | 38.2 | 1.47 | 38.9 |
| 21 | 1.89 | 13.2 | 21.4 | 1.51 | 35.3 |
| 22 | 1.91 | 14.3 | 32.8 | 1.53 | 37.9 |
| 23 | 1.87 | 14.4 | 37.1 | 1.47 | 36.2 |
| 24 | 2.21 | 6.0 | 9.2 | 0.1 | 240.4 |

As is apparent from Tables 2 and 4, the electric double layer capacitor of the present invention has a low internal resistance at a low temperature, and decrease in its capacity and increase in its internal resistance during application of a voltage as high as 3.3 V are little. Therefore, the electric double layer capacitor of the present invention can work with a high working voltage for a long time with excellent reliability.

By virtue of the use of an organic type mixed solvent containing sulfolane and a chain carbonic acid ester as the solvent in the electrolyte, the electric double layer capacitor of the present invention can attain a working voltage as high as 3.3 V per unit cell, and by virtue of the high working voltage, it has a high energy density and such excellent properties that decrease in the capacitance and increase in the internal resistance are little. Consequently, the electric double layer capacitor of the present invention can back up an IC on a unit cell basis with a back up voltage of 3.0 V and has a high reliability.

What is claimed is:

1. An electric double layer capacitor comprising a polarization electrode and an electrolyte capable of forming an electric double layer on the surface of the polarization electrode, wherein the solvent in the electrolyte is a mixed organic solvent containing sulfolane or a sulfolane derivative, and a chain carbonic acid ester represented by the formula $R^1O(CO)OR^2$, wherein $R^1$ and $R^2$, which may be the same or different, are organic groups selected from the group consisting of $CH_3$, $C_2H_5$, $(CH_3)_2CH$, $CH_3(CH_2)_3$ and $CF_3CH_2$.

2. The electric double layer capacitor according to claim 1, wherein $R^1$ and $R^2$ are different monovalent organic groups.

3. The electric double layer capacitor according to claim 1, wherein the solvent contains from 15 to 85 vol % of sulfolane or a sulfolane derivative, and from 85 to 15 vol % of a chain carbonic acid ester.

4. The electric double layer capacitor according to claim 1, wherein the electrolyte contains a quaternary phosphonium salt or a quaternary ammonium salt.

5. The electric double layer capacitor according to claim 3, wherein the mixed solvent contains from 25 to 75 volume % of sulfolane or derivative thereof and from 75 to 25 volume % of said chain carbonic acid ester.

6. The electric double layer capacitor according to claim 1, wherein said sulfolane derivative is 3-methylsulfolane or 2,4- dimethylsulfolane.

7. The electric double layer capacitor according to claim 1, wherein the electrolyte salt component of said electrolyte ranges in concentration from 0.3–2.0M.

8. The electric double layer capacitor according to claim 7, wherein said concentration range is 0.5–1.2 1 M.

* * * * *